Oct. 28, 1924.
M. H. SPIELMAN
1,513,192
LAMP STRUCTURE FOR MOTOR VEHICLES
Filed Dec. 24, 1920    2 Sheets-Sheet 1
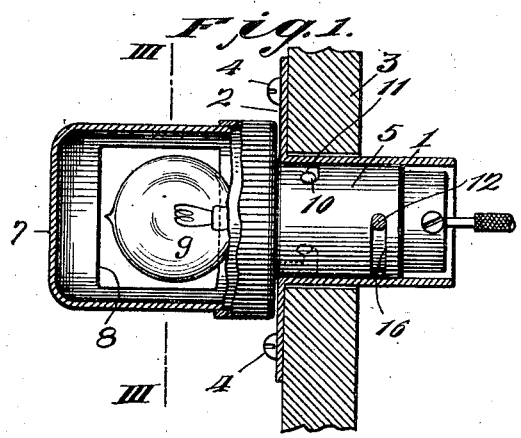
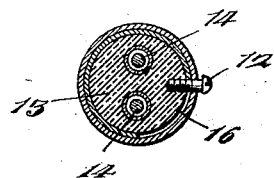
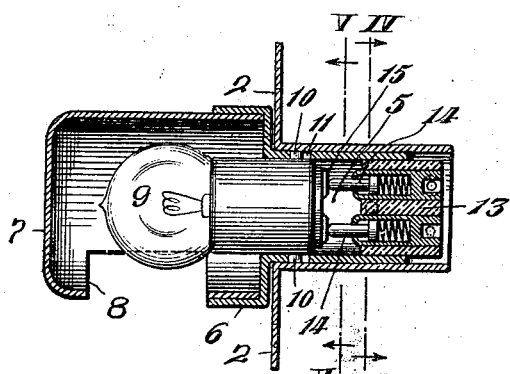
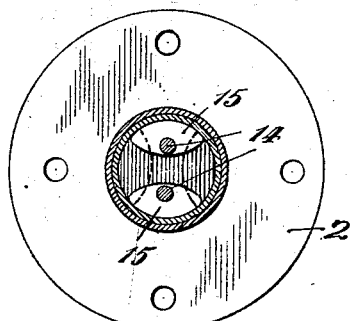
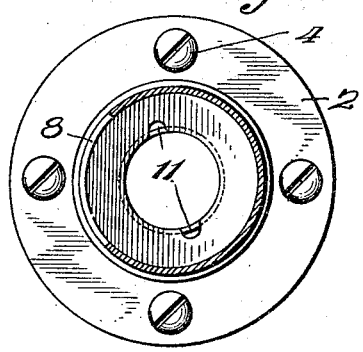
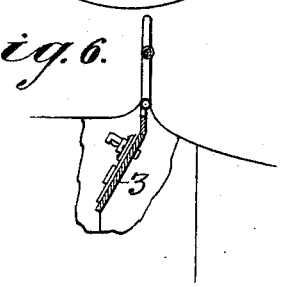
INVENTOR
Maximillian H. Spielman
BY
Musser, Hammond & Middleton
ATTORNEYS Oct. 28, 1924.
M. H. SPIELMAN
1,513,192
LAMP STRUCTURE FOR MOTOR VEHICLES
Filed Dec. 24, 1920    2 Sheets-Sheet 2
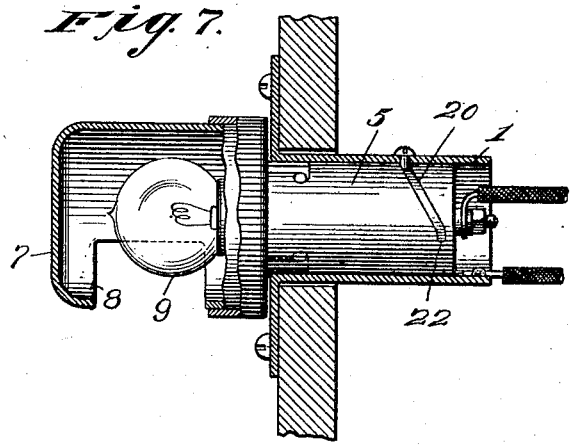
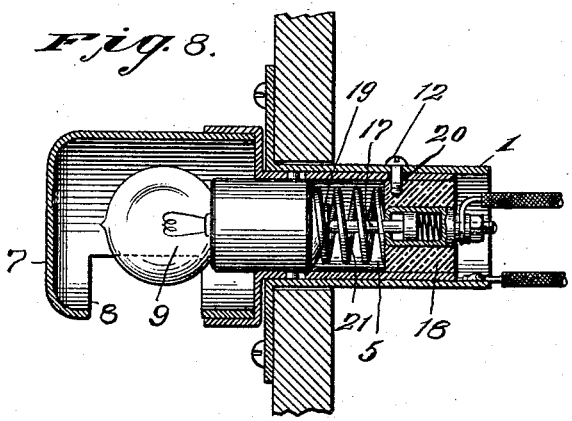
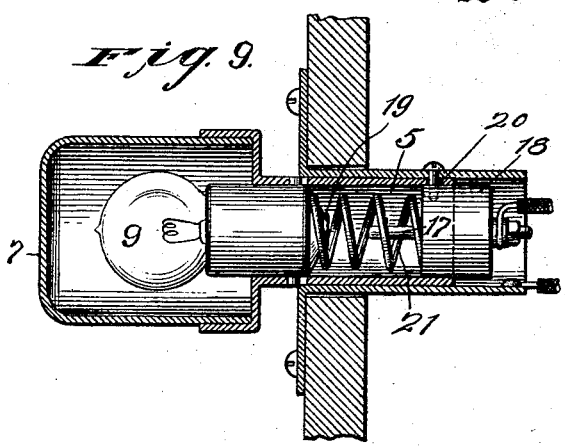
INVENTOR
Maximillian H. Spielman
BY
Morse, Hammond & Middleton
ATTORNEYS Patented Oct. 28, 1924.

1,513,192

UNITED STATES PATENT OFFICE.

MAXIMILLIAN H. SPIELMAN, OF NEW YORK, N. Y.

LAMP STRUCTURE FOR MOTOR VEHICLES.

Application filed December 24, 1920. Serial No. 432,930.

*To all whom it may concern:*

Be it known that I, MAXIMILLIAN H. SPIELMAN, a citizen of the United States, residing in the city, county, and State of New York, have invented certain new and useful Improvements in Lamp Structures for Motor Vehicles, of which the following is a specification.

This invention relates to improvements in lamp structures, and is particularly applicable for use in connection with dash lamps, parking lamps, and the like, of motor vehicles.

One of the objects of the invention is to provide a device of this character which is so constructed that the use of a separate and independent switch for controlling the operation of the lamp is avoided; and is so constructed that the circuit for the lamp is closed when the apertured hood over the lamp is in a position to direct light in the desired direction and is closed when the apertured hood is rotated to a position in which if the lamp were lighted said hood would not direct light in the desired direction. A structure of this character is particularly useful on motor vehicles because no switch mechanism independent of the lamp structure is necessary, and because the method of turning the lamp on and off is made obvious by the position of the apertured hood.

The invention further has for its object to provide a device of this character which is of simple and compact construction, efficient in use and economical to manufacture.

In the accompanying drawings forming part of this specification, wherein I have shown two preferred embodiments of my invention for illustrating the principle thereof, Figure 1 is a view partly in side elevation and partly in section of a device embodying my invention, the lamp housing being shown in its inoperative position;

Figure 2 is a longitudinal sectional view thereof, the lamp housing parts being shown in its operative position;

Figure 3 is a sectional view taken on the line III—III of Figure 1;

Figure 4 is a sectional view taken on the line IV—IV of Figure 2;

Figure 5 is a sectional view taken on the line V—V of Figure 2;

Figure 6 is a view showing the device mounted upon the instrument board of a motor vehicle;

Figure 7 is a view partly in side elevation and partly in section of a modified form of the device, the lamp housing being shown in its operative position;

Figure 8 is a longitudinal sectional view of the device as shown in Figure 7, and Figure 9 is a view similar to Figure 8, the lamp housing being shown in its inoperative position.

For purposes of illustration, I have illustrated my invention as embodied in a dash lamp adapted to be mounted upon the instrument board of a motor vehicle but it is to be understood that the invention is not to be limited to the type of lamp shown as it is equally applicable in connection with other types of lamps, or the like, such as parking lights for automobiles, for example.

Referring to Figures 1 to 5 the device is shown as comprising a tubular supporting member or frame 1 having a flange 2 at one end thereof whereby it may be secured to a suitable support 3, such as the instrument board of a motor vehicle, in any suitable manner as by screws 4. Rotatably mounted upon the tubular support 1 is a tubular member 5 provided at its outer end with an enlarged flanged portion 6 adapted to receive the inner end of a casing member or hood 7 having an aperture 8 in its side wall. The tubular member 5 and the apertured hood 7 constitute a housing for an electric lamp 9 which is removably held within the housing by means of pins or lugs 10 secured to the base of the lamp and adapted to engage bayonet slots 11 formed in the tubular member 5. Secured within the tubular support 1 by a screw 12 or the like is a cylindrical block 13 of insulating material carrying spring pressed contact members 14 adapted to be connected to a suitable source of electric energy. The contact members 14 co-act with contact members 15 upon the base of the lamp and to which the terminals of the lamp filament are connected. The screw 12 extends through a circumferentially-extending slot 16 formed in the tubular member 5 of the lamp housing to permit of the rotation thereof, and the length of the slot 16 is preferably such as to permit the housing to be rotated through an angle of ninety degrees in passing from one of its extreme positions to the other thereof. When the housing is in one of its positions the contact members 14 will engage the contact members 15 as shown in Figure 5 and in full lines in Figure 5, whereby the lamp 9 will be connected to the source of electric energy. Upon rotating the housing to occupy its other position, the contact members 15 will be carried out of engagement with the contact members 14, as indicated by dotted lines in Figure 5, thus breaking the circuit through the lamp. The parts are so arranged that when the contact members 14 and 15 are in engagement with one another, the lamp housing will occupy its operative position, shown in Figure 2, with the aperture 8 in the casing member 7 so located with respect to the lamp 9 that the rays of light emanating therefrom will be directed upon the instrument or instruments carried by the instrument board, as indicated in Figure 6. Upon rotating the lamp housing through an angle of ninety degrees it will occupy its inoperative position, as shown in Figures 1 and 3, and when in this position the contacts 14 and 15 will be out of engagement with one another as hereinabove explained. It will thus be seen that the lighting or extinguishing of the lamp is effected by merely rotating the lamp housing from its inoperative to its operative position, or vice versa.

This construction avoids the use of a separate and independent switch for turning the light on or off, such as is now commonly employed in connection with devices of this character, which switch is mounted either directly upon the tubular portion of the lamp housing, or upon the instrument board adjacent to the device. When the switch is mounted upon the tubular portion of the housing the device must necessarily extend forwardly from the board a distance sufficient to permit the switch to be interposed between the board and the hooded portion of the housing, and this arrangement is undesirable as the device is more liable to be struck by persons within the vehicle than if the hood of the housing is so positioned that the rear portion is substantially flush with the board, as is the case in connection with the device constructed in accordance with my invention. Furthermore, when the hood is thus spaced from the board the rays of light passing through the aperture therein will not properly illuminate the instrument or instruments associated therewith, as such instruments are preferably mounted upon the board in such a manner that they are substantially flush with the front surface of the board.

The use of an independent switch mounted upon the instrument board adjacent to the lamp is objectionable as it necessitates wiring between the switch and the lamp, thus rendering the device complicated and expensive to manufacture and install. In accordance with my invention, it is not necessary to employ a separate and independent switch to control the illumination of the lamp, and consequently the device may be so constructed that it may be mounted upon the board with the hooded portion of the housing substantially flush with the board and no additional wiring is necessary. It will thus be seen that the objectionable features incident to the devices now commonly in use are not present in the device constructed in accordance with my invention. Moreover my device is more compact and simple in its construction than the present devices, and is more economical to manufacture.

Furthermore, by providing a lamp structure in which the light may be turned on or off by merely rotating the projecting hood, the switching on or off of the light is made much more convenient than where it is necessary to grope for a small switch in the rear of the light and turn the switch sometimes with a movement of the switch longitudinally of the mounting.

In the modified construction shown in Figures 7, 8 and 9, I have shown a single pole switching mechanism, in which one of the conductors leading from the source of electric energy is connected to the tubular supporting member 1 and the other conductor is connected to a spring pressed contact member 17 centrally positioned with respect to a block 18 of insulating material, secured within the support by the screw 12 as explained above in connection with Figures 1 to 5. The contact member 17 co-acts with a centrally-positioned contact member 19 upon the base of the lamp 9 which is connected to one terminal of the lamp filament, the other terminal of the filament being connected to the outer shell of the lamp base in the usual manner. The screw 12 extends through an angularly-disposed slot 20 formed in the tubular member 5 of the lamp housing whereby as the housing is rotated it will be moved back and forth with respect to the tubular support, and as the lamp is fixed within the housing the contact member 19 will be moved into and out of engagement with the contact member 17, as illustrated in Figures 8 and 9. A spring 21, interposed between the lamp base and the insulating block, serves to hold the lamp in its adjusted positions, at which times the screw 12 is seated in one or the other of offset portions 22 at the ends of the slot 20. The parts are so arranged that the contact members 17 and 19 will be in engagement when the lamp housing is in its innermost or operative position, as shown in Figure 8, and when the housing is thus positioned the aperture 8 thereof will be so located that the rays of light emanating from the lamp will be directed upon the instrument or instruments carried by the instrument board, whereby the lighting of the lamp is effected by rotating the lamp housing to occupy its operative position as explained above.

The invention is also applicable for use in connection with parking lamps mounted upon the fenders of automobiles. In such a case the lamp housing, which is provided with lenses at its ends, is mounted to rotate about a vertical axis in a manner similar to that shown and described above in connection with the dash lamp, and the parts are so arranged that the lamp will be lit when the housing has been rotated so that its horizontal axis will be parallel to the automobile frame, at which time the lenses will be so positioned as to direct the rays of light to the front and to the rear.

While I have illustrated and described my invention in connection with two preferred embodiments thereof, it will be understood that I do not intend to limit myself to the specific embodiments shown, but that I intend to cover my invention broadly in whatever form its principle may be employed.

Having thus described my invention, I claim

1. In a lamp structure adapted to be mounted upon a motor vehicle, a tubular supporting frame adapted to be attached to a portion of the vehicle, a tubular member extending into said frame and adapted to receive and hold the base of a lamp, there being a slot in said tubular member, an apertured hood supported by the tubular member, a cylindrical block of insulating material located within the inner end of said tubular member, a screw extending thru a hole in the supporting frame and thru the slot in said tubular member and into said block of insulating material whereby the frame and block are held from relative movement and the rotary movement of the tubular member is limited, and a spring pressed contact member mounted in said block and adapted to be engaged by a terminal of a lamp mounted in said tubular member when the latter is rotated to the position in which the hood directs light in the desired direction and to be disengaged from said lamp terminal when the tubular member is rotated to the position in which if the lamp were lighted the hood would not direct light in the desired direction.

2. In a lamp structure adapted to be mounted upon the instrument board of a motor vehicle, a flanged tubular supporting frame adapted to be inserted thru and attached to the instrument board, a tubular member extending into said frame and having an enlarged flanged portion, said tubular member having bayonet slots adapted to receive lugs extending from a lamp base and another slot, a cylindrical block of insulating material located within the inner end of said tubular member, a screw extending thru a hole in the supporting frame and the last mentioned slot in the tubular member and into said block of insulting material whereby the frame and block are held from relative movement and the rotary movement of the tubular member is limited, and a spring pressed contact member mounted in said block and adapted to be engaged by and disengaged from the terminal of a lamp mounted in said tubular member when the latter is rotated.

3. In a lamp structure adapted to be mounted upon a motor vehicle, a flanged tubular supporting frame adapted to be attached to a portion of the motor vehicle, a tubular member extending into said frame and having an enlarged flanged portion, said tubular member having bayonet slots adapted to receive lugs extending from a lamp base and also having another slot, an apertured hood supported by the flanged portion of the tubular member, a cylindrical block of insulating material located within the inner end of said tubular member, a screw extending thru a hole in the supporting frame and the last mentioned slot in the tubular member and into said block of insulating material whereby the frame and block are held from relative movement and the rotary movement of the tubular member is limited, and spring pressed contact members mounted in said block and adapted to be engaged by the terminals of a lamp mounted in said tubular member when the latter is rotated to the position in which the hood directs light in the desired direction and adapted to be disengaged from said terminals when the tubular member is rotated to a position in which said apertured hood, if the lamp were lighted, would not direct light in the desired direction.

4. In combination, a tubular supporting member comprising a flange whereby the same may be secured to the instrument board of a motor vehicle, a block of insulating material mounted in said supporting member, a housing mounted to rotate within said supporting member, an incandescent lamp mounted within said housing, a fastening member for fixing said insulating member in position with respect to said supporting member, said housing being provided with a slot for receiving said fastening member, whereby said housing is held within said tubular member but free to rotate through an angle about its axis, and whereby said insulating block is fixed in position with respect to said tubular member, and cooperative contact means associated with said lamp and block whereby in one position the circuit of the lamp is closed and in the other position open.

5. In combination, a tubular supporting member, means for securing said supporting member to the instrument board of a motor vehicle, a block of insulating material fixedly mounted in said supporting member, a housing mounted to rotate with respect to said supporting member, an incandescent lamp mounted within said housing, a pin and groove connection between said housing and said supporting member preventing longitudinal movement of the housing but leaving the housing free to rotate thru an angle about its axis and cooperative contact means associated with said lamp and block whereby in one position of the housing the circuit of the lamp is closed and in the other position open.

6. In combination, a tubular supporting member comprising a flange whereby the same may be secured to the instrument board of a motor vehicle, a block of insulating material fixedly mounted in said supporting member, a housing mounted to rotate with respect to said supporting member, an incandescent lamp mounted within said housing, a pin and groove connection between said housing and said supporting member preventing longitudinal movement of the housing but leaving the housing free to rotate thru an angle about its axis, cooperative contact means associated with said lamp and block whereby in one position of the housing the circuit of the lamp is closed and in the other position open, said housing including an apertured hood adapted to be grasped to rotate said housing, said apertured hood when the lamp circuit is closed being in position to direct the light in the desired direction.

In testimony whereof I have affixed my signature to this specification.

MAXIMILLIAN H. SPIELMAN.